United States Patent

Feierbach et al.

[11] Patent Number: 6,065,097
[45] Date of Patent: May 16, 2000

[54] APPARATUS AND METHOD FOR SHARING A UNIFIED MEMORY BUS BETWEEN EXTERNAL CACHE MEMORY AND PRIMARY MEMORY

[75] Inventors: Gary F. Feierbach, Belmont; Yanhua Sun, Santa Clara; Marcel Dignum, Menlo Park; Norman Hayes, Sunnyvale; Saed Muhssin, San Francisco, all of Calif.

[73] Assignee: Sun Microsystems, Inc., Mountain View, Calif.

[21] Appl. No.: 08/705,400

[22] Filed: Aug. 29, 1996

[51] Int. Cl.[7] .................................................. G06F 12/08
[52] U.S. Cl. .......................... 711/118; 711/122; 711/138; 711/168
[58] Field of Search .................................... 711/122, 138, 711/118, 168

[56] References Cited

U.S. PATENT DOCUMENTS

| | | | |
|---|---|---|---|
| 4,774,654 | 9/1988 | Pomerene et al. | 711/122 |
| 4,847,758 | 7/1989 | Olson et al. | 711/133 |
| 5,058,006 | 10/1991 | Durdan et al. | 711/122 |
| 5,136,700 | 8/1992 | Thacker | 711/122 |
| 5,276,836 | 1/1994 | Fukumaru et al. | 711/138 |
| 5,325,508 | 6/1994 | Parks et al. | 711/118 |
| 5,367,657 | 11/1994 | Khare et al. | 711/118 |
| 5,371,872 | 12/1994 | Larsen et al. | 711/118 |
| 5,386,547 | 1/1995 | Jouppi | 711/122 |
| 5,737,746 | 4/1998 | Hardin et al. | 711/118 |
| 5,829,010 | 10/1998 | Cherabuddi | 711/122 |
| 5,873,114 | 2/1999 | Rahman et al. | 711/106 |

FOREIGN PATENT DOCUMENTS

461925  12/1991  European Pat. Off. .

*Primary Examiner*—Reginald G. Bragdon
*Attorney, Agent, or Firm*—William S. Galliani; Pennie & Edmonds LLP

[57] ABSTRACT

A computer system includes a central processing unit with an internal memory controller. The internal memory controller interacts with an external cache and a primary memory through a single unified memory bus. The internal memory controller generates a shared row address that is applied to the unified memory bus during an address fetching operation to simultaneously access a row in primary memory and an address in external cache. The internal memory controller may also generate a shared column address that is applied to the unified memory bus during a data return operation to simultaneously specify a column in primary memory and an address in external cache.

22 Claims, 12 Drawing Sheets

APPARATUS AND METHOD FOR SHARING A UNIFIED MEMORY BUS BETWEEN EXTERNAL CACHE MEMORY AND PRIMARY MEMORY

BRIEF DESCRIPTION OF THE INVENTION

This invention relates generally to the memory systems of computers. More particularly, this invention relates to an efficient unified memory bus that is shared by external cache memory and primary memory of a computer system.

BACKGROUND OF THE INVENTION

Figure 1:
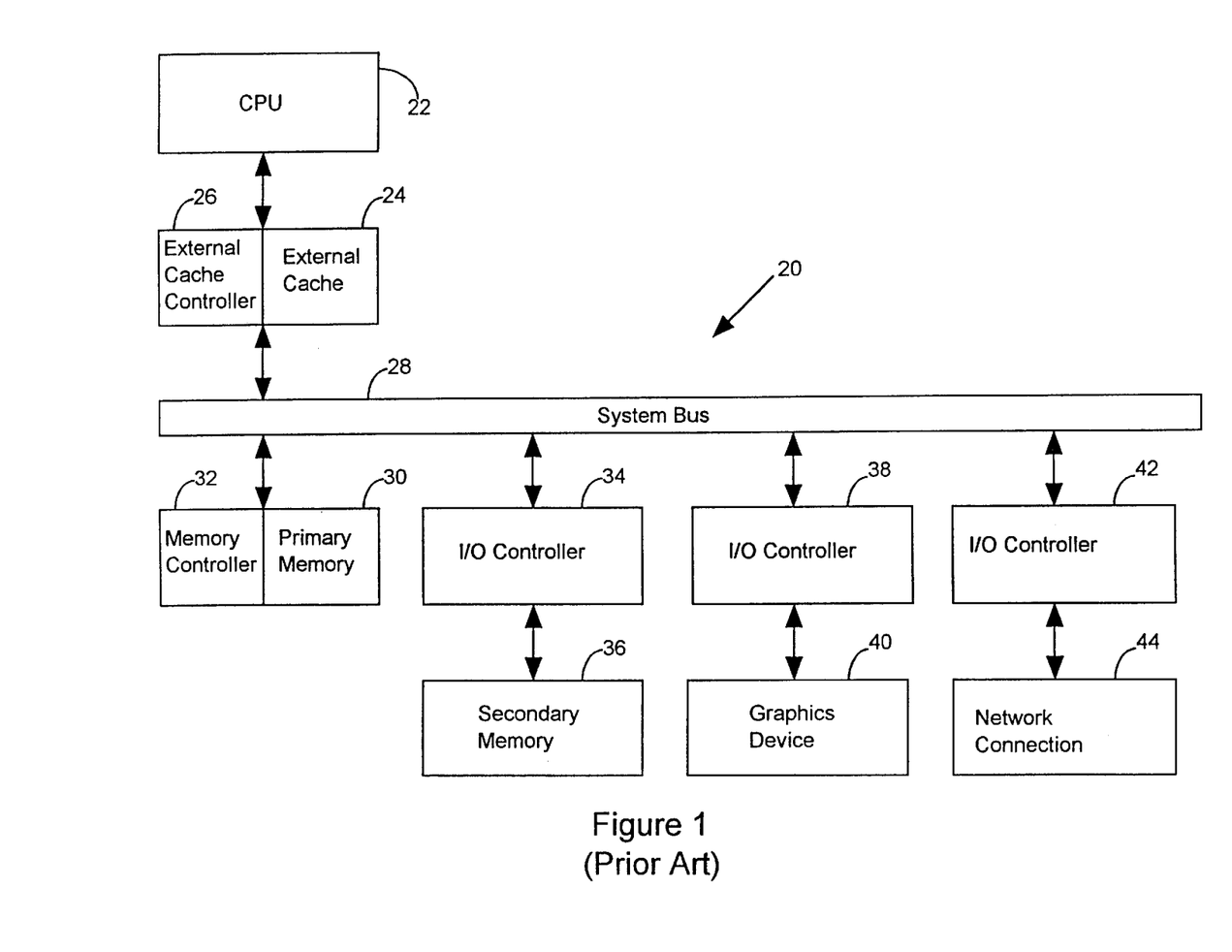
FIG. 1 illustrates a prior art computer system.

FIG. 1 is an illustration of a general purpose computer 20. The computer 20 includes a central processing unit (CPU) 22. The CPU 22 executes instructions of a computer program. Each instruction is located at a memory address. Similarly, the data associated with an instruction is located at a memory address. The CPU 22 accesses a specified memory address to fetch the instruction or data stored there.

Most CPUs include an on-board memory called a cache. The cache stores a set of memory addresses and the instructions or data associated with the memory addresses. If a specified address is not in the internal, or L1 cache, then the CPU 22 looks for the specified address in an external cache, also called an L2 cache 24. The external cache is typically implemented using Static Random Access Memories (SRAMs). Standard SRAMs are simply storage devices. Thus, they are operated with a separate circuit known as an external cache controller 26.

If the address is not in the external cache 24 (a cache miss), then the external cache 24 requests access to a system bus 28. When the system bus 28 becomes available, the external cache 24 is allowed to route its address request to the primary memory 30. The primary memory 30 is typically implemented using Dynamic Random Access Memories (DRAMs). As in the case of SRAMs, DRAMs are simply memory devices. Thus, they are operated with a separate circuit known as an external memory controller 32.

The data output from the primary memory 30 is applied to the system bus 28. It is then stored in the external cache 24 and is passed to the CPU 22 for processing. The processing described in reference to FIG. 1 must be performed for every address request. Indeed, if the address request is not found in the primary memory 30, similar processing is performed by an input/output controller 34 associated with a secondary memory 36.

As shown in FIG. 1, there are additional devices connected to the system bus 28. For example, FIG. 1 illustrates an input/output controller 38 operating as an interface between a graphics device 40 and the system bus 28. In addition, the figure illustrates an input/output controller 42 operating as an interface between a network connection circuit 44 and the system bus 28.

The multiple connections to the system bus 28 result in a relatively large amount of traffic. It would be desirable to remove memory transactions from the system bus 28 in order to reduce traffic on the system bus 28. It is known to remove memory transactions from the system bus 28 by using a separate memory bus for external cache 24 and a separate memory bus for primary memory 30. This approach results in a relatively large number of CPU package pins. It is important to reduce the number of CPU package pins. Thus, it would be highly desirable to reduce the traffic on the system bus without increasing the number of CPU package pins. In addition, it would be desirable to eliminate the need for the external logic associated with external cache and primary memories.

SUMMARY OF THE INVENTION

The computer system of the invention includes a central processing unit with an internal memory controller. The internal memory controller interacts with an external cache and a primary memory through a single unified memory bus. The internal memory controller generates a shared row address that is applied to the unified memory bus during an address fetching operation to simultaneously access a row in primary memory and an address in external cache. The internal memory controller may also generate a shared column address that is applied to the unified memory bus during a data return operation to simultaneously specify a column in primary memory and an address in external cache.

The invention provides a computer system with a single unified memory bus that is shared by external cache and primary memory. The invention allows standard SRAMS (for the external cache) and DRAMS (for primary memory) to be used without associated external controllers, thereby reducing the number of external chips in the system. The unified memory bus also reduces the pin count of the central processing unit.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 2:
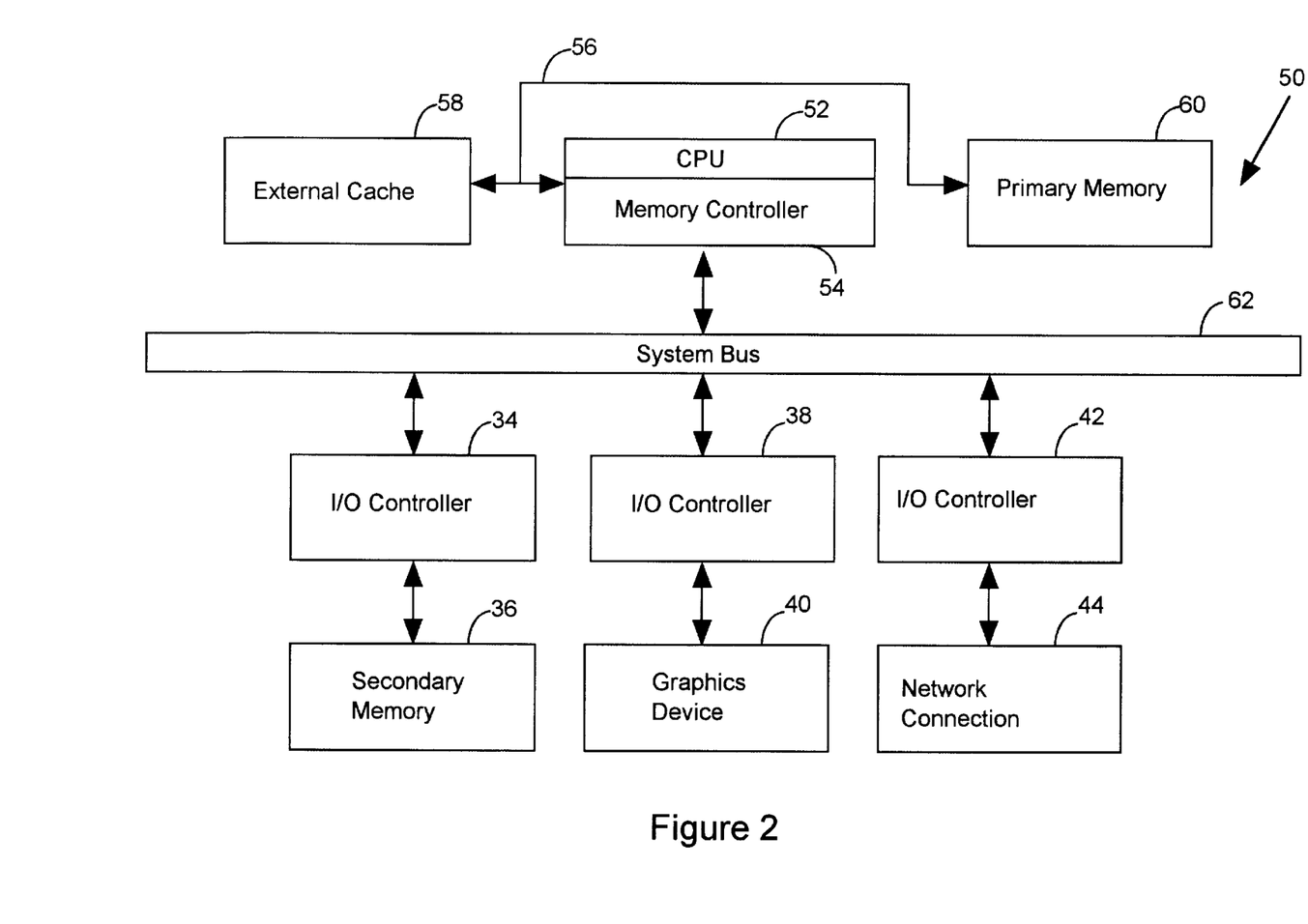
FIG. 2 illustrates a computer system in accordance with an embodiment of the invention.

FIG. 2 illustrates a computer 50 constructed in accordance with an embodiment of the invention. The computer 50 includes a CPU 52 with an internal memory controller 54. A single unified memory bus 56 is used for communicating with the external cache 58 and primary memory 60.

Those skilled in the art will recognize a number of benefits associated with this architecture. First, the unified memory bus 56 reduces the pin count of the central processing unit 52. In other words, since separate buses are not used for external cache 58 and primary memory 60, fewer CPU pins are required. Another benefit of the invention is that the internal memory controller 54 eliminates the need for external memory controllers. Thus, the invention allows standard SRAMs (for the external cache) and DRAMs (for the primary memory) to be used without associated external controllers, thereby reducing the number of external chips in the system.

The remaining elements shown in FIG. 2 are consistent with those shown in FIG. 1. Thus, they will not be discussed further. Instead, attention turns to the memory controller 54 and its interaction with the unified memory bus 56.

Figure 3:
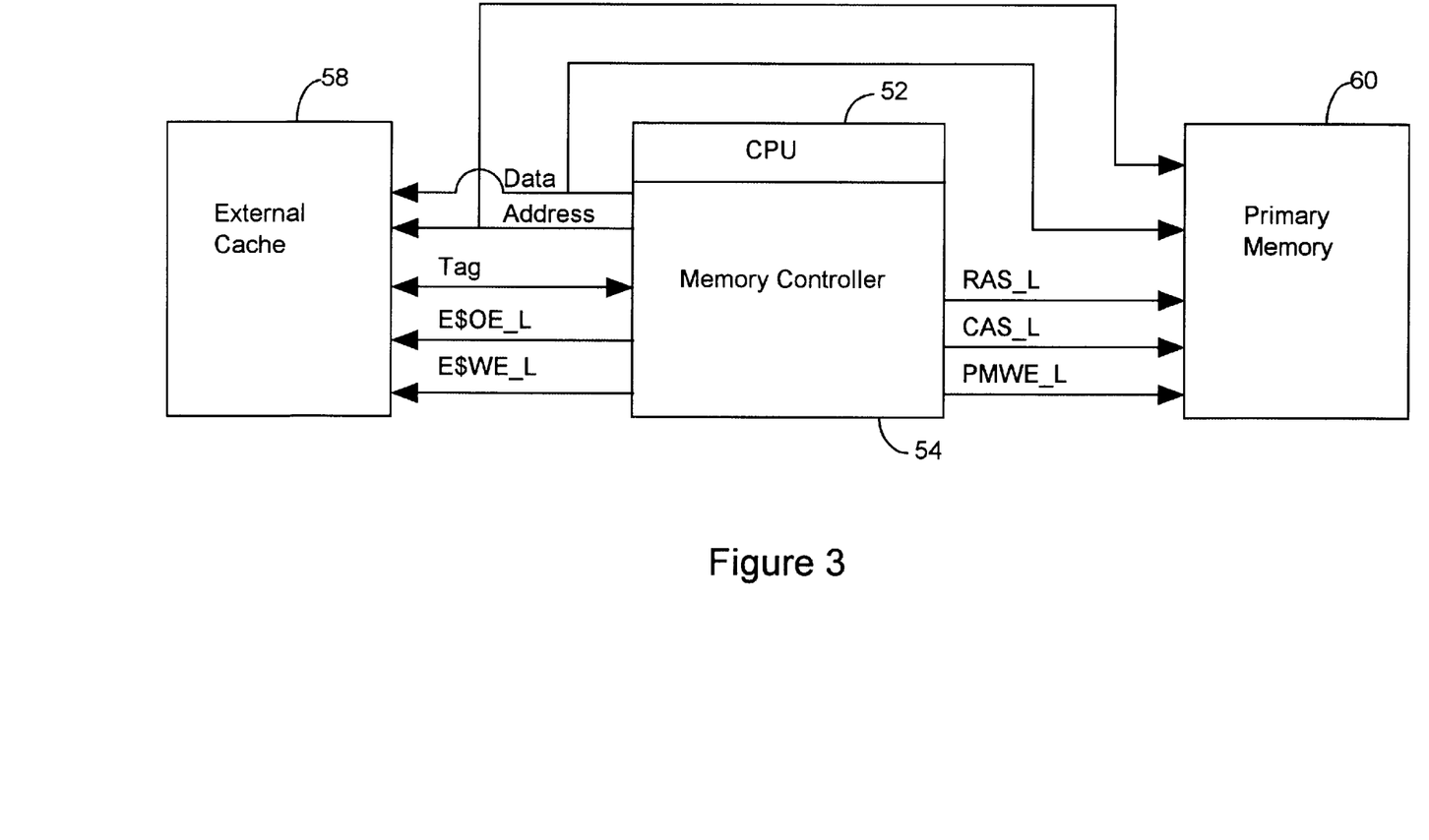
FIG. 3 is a more detailed illustration of the memory system, including a unified memory bus, of the computer system of FIG. 2.

FIG. 3 illustrates the CPU 52, external cache 58, and primary memory 60 of FIG. 2. The signal lines connected between these devices constitute the unified memory bus of the invention. Thus, in the embodiment of FIG. 3, the unified memory bus includes the following: a multi-bit data bus, a multi-bit address bus, a multi-bit tag bus, an external cache output enable active low (E$OE_L) line, an external cache write enable active low (E$WE_L) line, a row access strobe active low (RAS_L) line, a column access strobe active low (CAS_L) line, and a primary memory write enable active low (PMWE_L) line. These particular signal lines are selected to illustrate an embodiment of the invention. FIGS. 5–12 provide examples of the use of these signal lines. Those skilled in the art will recognize that the functionality described herein can be achieved through the use of different signal lines.

Figure 4:
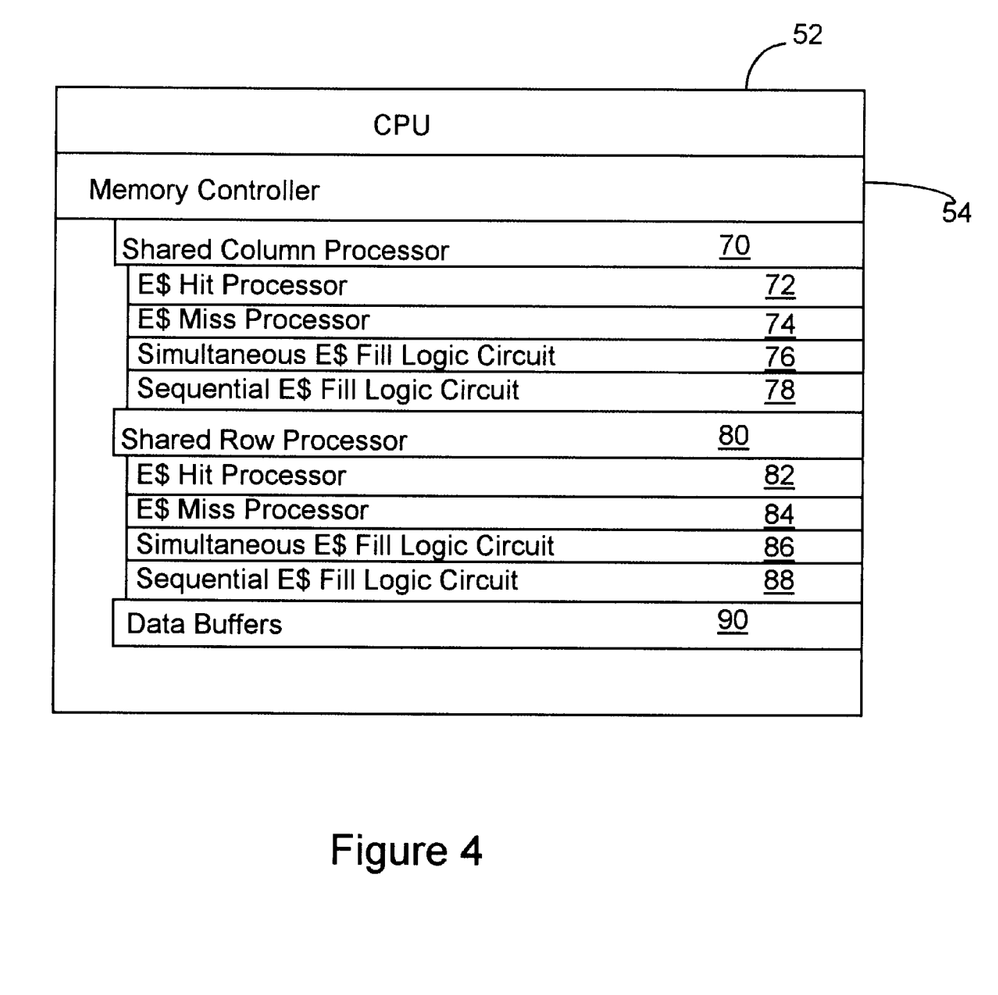
FIG. 4 illustrates a memory controller used in accordance with an embodiment of the invention.

FIG. 4 illustrates a CPU 52 and associated memory controller 54 constructed in accordance with an embodiment of the invention. The memory controller 54 includes a shared column processor 70. The shared column processor 70 is used to generate a shared column address and control signals that are applied to the unified memory bus during a data return operation. The shared column address simultaneously specifies a column in primary memory 60 and an address in external cache 58. Thus, the shared column address is used to fetch data from the primary memory 60 and load data into the external cache 58.

The shared column processor 70 may be implemented to include an external cache (E$) hit processor 72 for processing external cache hits and an external cache miss processor 74 for processing external cache misses. Further, the shared column processor 70 may include a simultaneous external cache fill logic circuit 76 to generate control signals to simultaneously load data from the unified memory bus 56 into the external cache 58 and the CPU 52. Finally, the shared column processor 70 may include a sequential external cache fill logic circuit 78 to generate control signals to sequentially load data from the unified memory bus 56 into the CPU 52 and then into the external cache 58.

The memory controller 54 may also be constructed to include a shared row processor 80. The shared row processor 80 is used to generate a shared row address and control signals that are applied to the unified memory bus during an address fetching operation. The signals cause a row in primary memory 60 and an address in external cache 58 to be simultaneously accessed. The shared row processor 80 may include an external cache hit processor 82 to process an external cache hit of a shared row address. An external cache miss processor 84 may be used to process an external cache miss of a shared row address. A simultaneous external cache fill logic circuit 86 may be used to generate control signals to simultaneously load data from the unified memory bus 56 into the external cache 58 and the CPU 52. Finally, a sequential external cache fill logic circuit 88 may be used to generate control signals to sequentially load data from the unified memory bus 56 into the CPU 52 and then into the external cache 58. Data buffers 90 may be used during the sequential loading process.

An embodiment of the invention may include the shared column processor 70 or the shared row processor 80 or a combination of the shared column processor 70 and the shared row processor 80. The particular processing units used in each processor are illustrative. Those skilled in the art will recognize a wide variety of feasible alternate embodiments that can be used to execute the functions described herein. In particular, a variety of alternate embodiments may be used to implement the functions described in reference to FIGS. 5–12.

Figure 5:
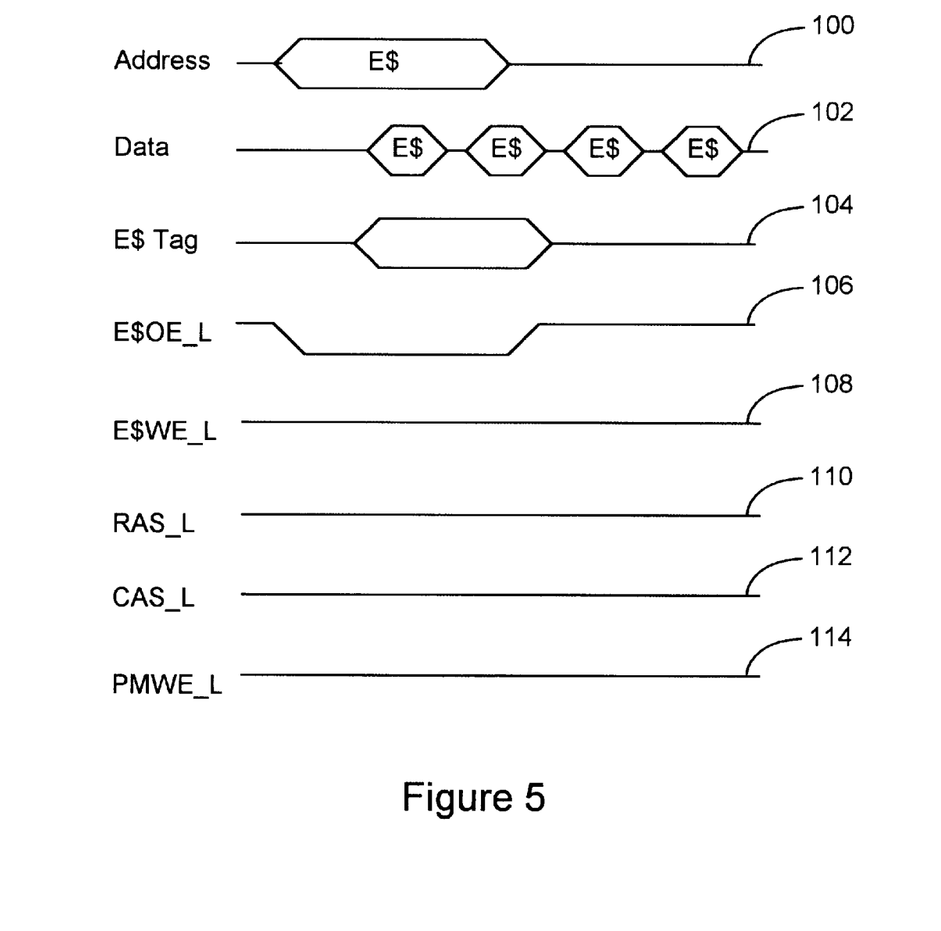
FIG. 5 is a set of timing diagrams showing the apparatus of FIG. 2 processing an external cache read hit in a shared column address embodiment of the invention.

FIG. 5 illustrates a set of timing diagrams showing the processing of an external cache read hit in a shared column address embodiment of the invention. In the shared column address embodiment of the invention, the shared column processor 70 initially searches for an address in the external cache 58. If the address exists in the external cache 80, it is passed back to the CPU 52 for processing. If the address does not exist in the external cache 80, then a search of the primary memory 60 is initiated by launching a row address and a set of column addresses to primary memory.

Waveform 100 of FIG. 5 illustrates an external cache address being launched on the address bus. Waveform 106 illustrates an external cache output enable active low signal (E$OE_L) being deasserted at approximately the same time that the address is launched. In this example, a valid external cache line is addressed, thus, external cache data is returned shortly after the address is launched, as shown with waveform 102. Similarly, a tag from the external cache is returned shortly after the address is launched, as shown with waveform 104. (As known in the art, a segment of a memory address (the cache address) is used as an index into a cache memory. If a position exists in the cache memory corresponding to the indexed value, then a tag at the position is compared to the remaining portion of the memory address. If a tag match occurs, then a cache hit exists and the data retrieved from the cache can be processed. Otherwise, a cache miss occurs and the data from the cache is ignored.)

In this example, the CPU 52 verifies a tag match, thus the external cache 58 has the data of interest and the cache data is processed by the CPU 52. Waveform 102 illustrates the passing of the external cache data to the CPU 52.

FIG. 5 is used to illustrate that the invention can be used with a sequential addressing technique that relies upon the initial launching of an external cache address. This technique stands in contrast to the shared row address embodiment of the invention. As described below, the shared row address embodiment launches an address that is simultaneously used by both the external cache 58 and primary memory 60.

Figure 6:
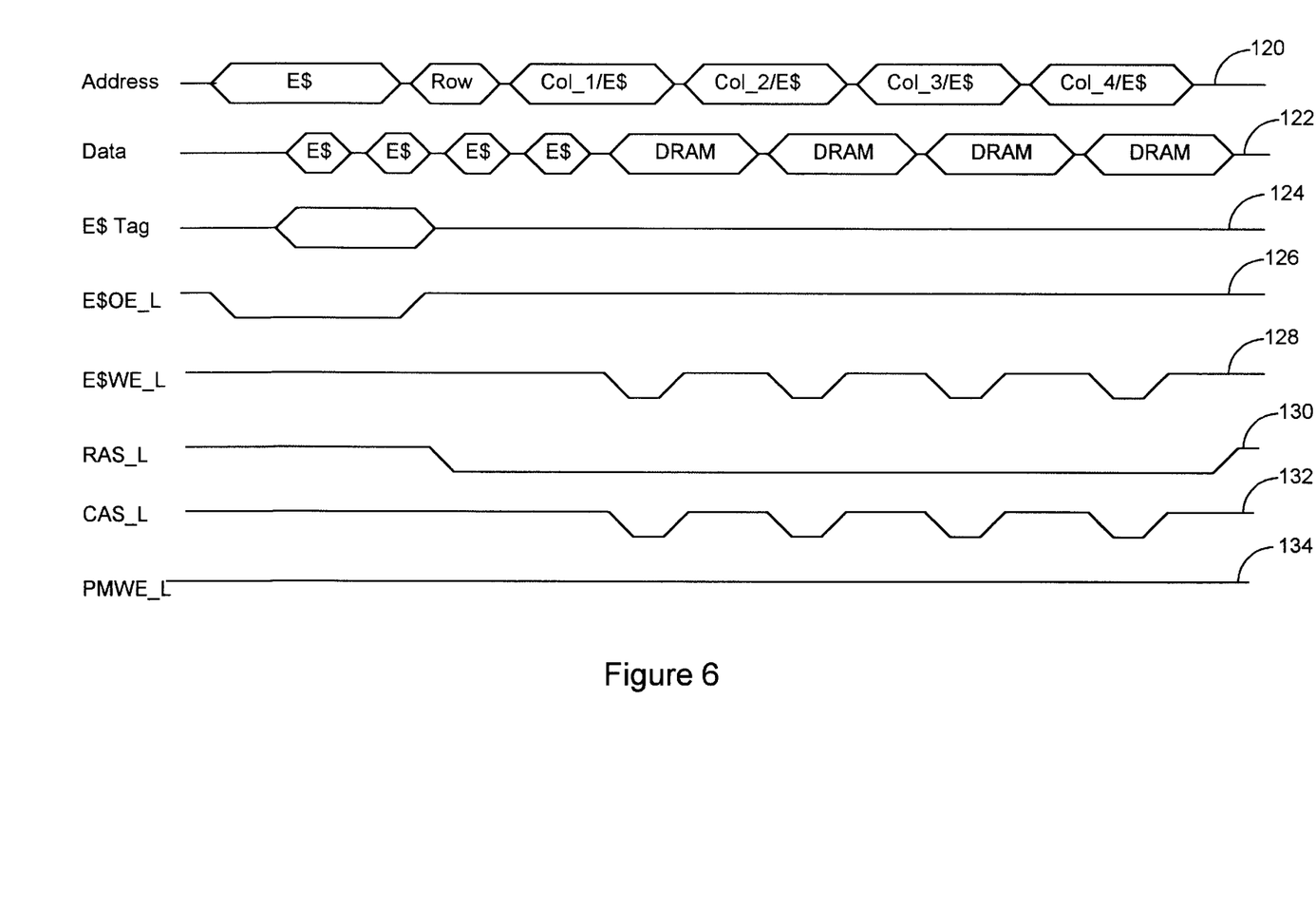
FIG. 6 is a set of timing diagrams showing the apparatus of FIG. 2 processing an external cache read miss from an invalid tag and a subsequent simultaneous external cache fill in a shared column address embodiment of the invention.

FIG. 6 illustrates an external cache read miss from an invalid tag and a subsequent simultaneous external cache fill in a shared column address embodiment of the invention. Waveform 120 of FIG. 6 illustrates the launching of an external cache address. The initial portions of waveforms 122, 124, and 126 respectively correspond to waveforms 102, 104, and 106 of FIG. 5. However, in this example, the external cache tag does not match. Thus, the data must be retrieved from primary memory 60.

Consequently, a row address is applied to the address, as shown with waveform 120. This operation is accompanied by the deassertion of the Row Access Strobe (RAS_L) signal. Subsequently, a column address (Col_1) is applied on the address line, as shown with waveform 120. The launching of the column address corresponds with the deassertion of the Column Access Strobe (CAS_L) signal. (The launching of a row address, the subsequent launching of a set of column addresses, and the corresponding deassertion of RAS and CAS signals is a standard primary memory access technique.)

Up to this point, FIG. 6 illustrates that the invention can be implemented by having the shared column processor 70 initially access the external cache 58 for data, and if that fails, subsequently access primary memory 60. Further, FIG. 6 illustrates that the column address that is launched includes an external cache address. That is, the notation "Col_1/E$" indicates that a column address for primary memory 60 is accompanied by an external cache address, hence the reference herein to a shared column address technique.

The first column address segment ("Col_1") of the launched data is used by the primary memory to return a first segment of data (shown as the first "DRAM" block of waveform 122). The first external cache address accompanying the first column address is used to load the data into the external cache 58. The loading of the data into the external cache is accompanied by the deassertion of the external cache write enable active low (E$WE_L) signal, as shown with waveform 128.

The processing of the remaining column addresses of waveform 120 is accomplished in a manner that is consistent with the processing of the first column address. This operation is shown in FIG. 6.

The shared column processor 70 generates the address and control signals shown in FIG. 6. The processing responsibilities of the shared column processor 70 may be divided in a variety of ways. For example, the external cache miss processor 74 of the shared column processor 70 may be used to generate the RAS_L and CAS_L signals in response to a cache miss. The simultaneous external cache fill logic circuit 76 may be used to deassert the external cache write enable (E$WE_L) signal to allow the loading of the retrieved data into the external cache 58 as it is simultaneously loaded into the CPU 52.

Figure 7:
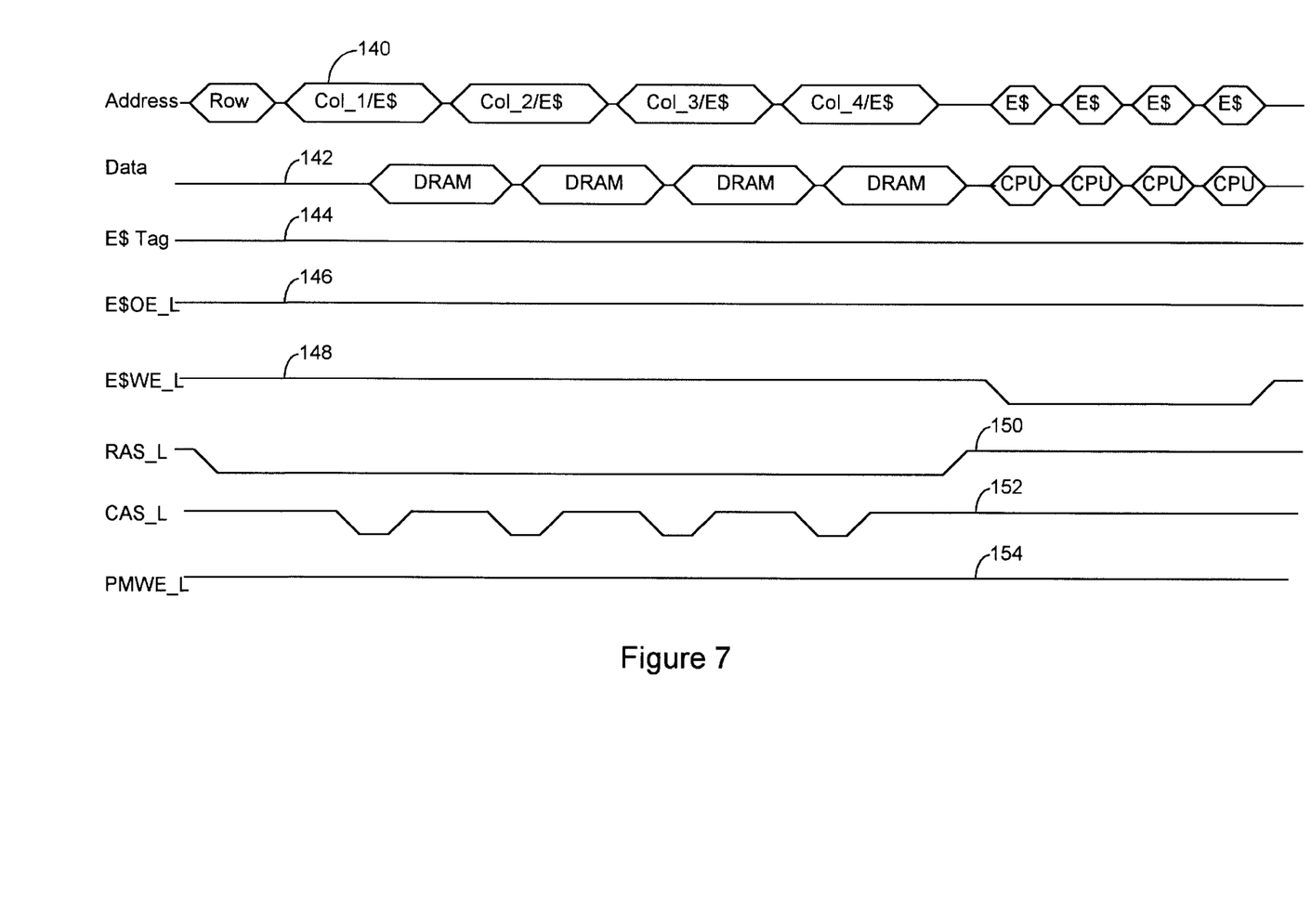
FIG. 7 is a set of timing diagrams showing the apparatus of FIG. 2 processing an external cache read miss from an invalid line and a subsequent sequential external cache fill in a shared column address embodiment of the invention.

FIG. 7 illustrates the processing of an external cache read miss from an invalid line and a subsequent sequential external cache fill in a shared column address embodiment of the invention. An external cache access is not illustrated in FIG. 7 because the memory controller 54 recognizes that the address specifies a line that does not exist in the external cache 58. Consequently, an access to the primary memory is initiated with the launching of a row address, as shown with waveform 140. This operation is accompanied by the deassertion of the RAS_L signal, as shown with waveform 150.

Following the launching of the row address, a shared column address data segment is launched. That is, a combination of a column address (Col_1) and external cache address is applied to the address bus. The launching of the column address is accompanied by the deassertion of the CAS_L signal, as shown with waveform 152.

This processing results in the return of a first segment of primary memory (DRAM) data, as shown with waveform 142. Similar processing is performed for the remaining column addresses. Note however, that in this example, the external cache write enable signal (E$WE_L) is not deasserted as the primary memory data is returned. This stands in contrast to the operation of FIG. 6 where the data was simultaneously loaded into the CPU 52 and the external cache 58. In FIG. 7, the primary memory data is sequentially loaded into the CPU 52 and is then loaded into the external cache 58. This technique allows the CPU 52 to receive and processes the data more quickly.

Note in FIG. 7 that the external cache write enable signal (E$WE_L) is not deasserted until all of the data has been returned to the CPU 52. At that time, waveform 142 illustrates that the CPU writes data on the data bus. Simultaneously, an external cache address is launched on the address bus, as shown with waveform 140.

The sequential external cache fill logic circuit 78 may be used to generate the external cache write enable signal (E$WE_L) shown in FIG. 7. The external cache miss processor 74 may be used to identify an invalid external cache line and thereby prompt the launching of the row address and sequence of column addresses shown with waveform 140.

Figure 8:
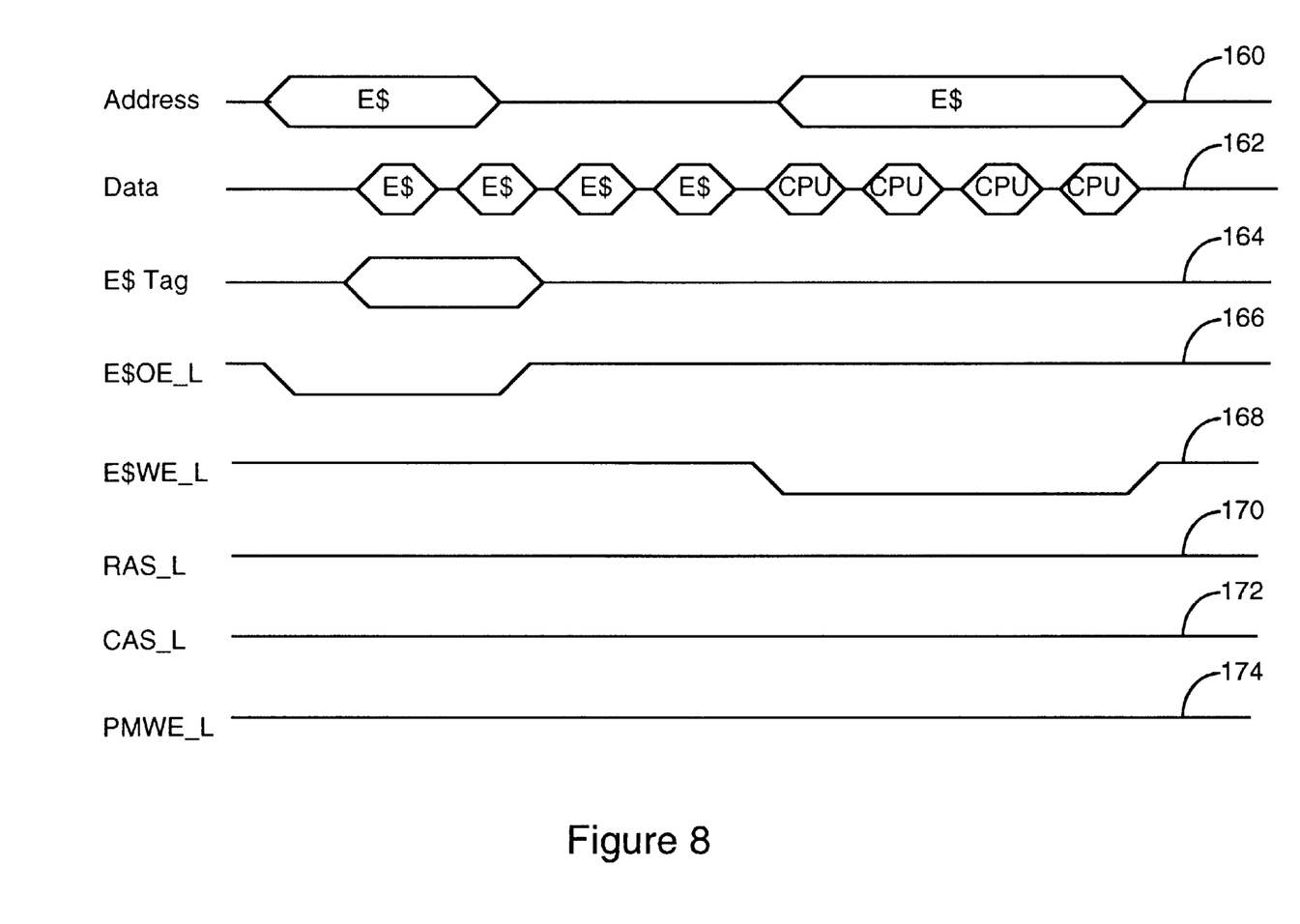
FIG. 8 is a set of timing diagrams showing the apparatus of FIG. 2 processing an external cache write hit in a shared column address embodiment of the invention.

FIG. 8 illustrates an external cache write hit operation. Waveform 160 illustrates an external cache address being applied to the address bus.

Simultaneously, the external cache output enable signal (E$OE_L) is deasserted. Waveform 162 illustrates that this processing causes the external cache 58 to return a set of data, while waveform 164 illustrates that this processing causes the external cache 58 to return a tag. In this example, the tag results in a match, thus a write hit exists. Consequently, the CPU 52 writes data to the data bus, as shown with waveform 162. Simultaneously, the memory controller 54 launches an external cache address, as shown with waveform 160. At the same time, the external cache write enable signal (E$WE_L) is deasserted, as shown with waveform 168, allowing the data from the CPU 52 to be loaded into the external cache 58. The external cache hit processor 72 may be used to coordinate this write-hit operation. In addition, the sequential external cache fill logic circuit 78 may be used to deassert the E$WE_L signal.

Figure 9:
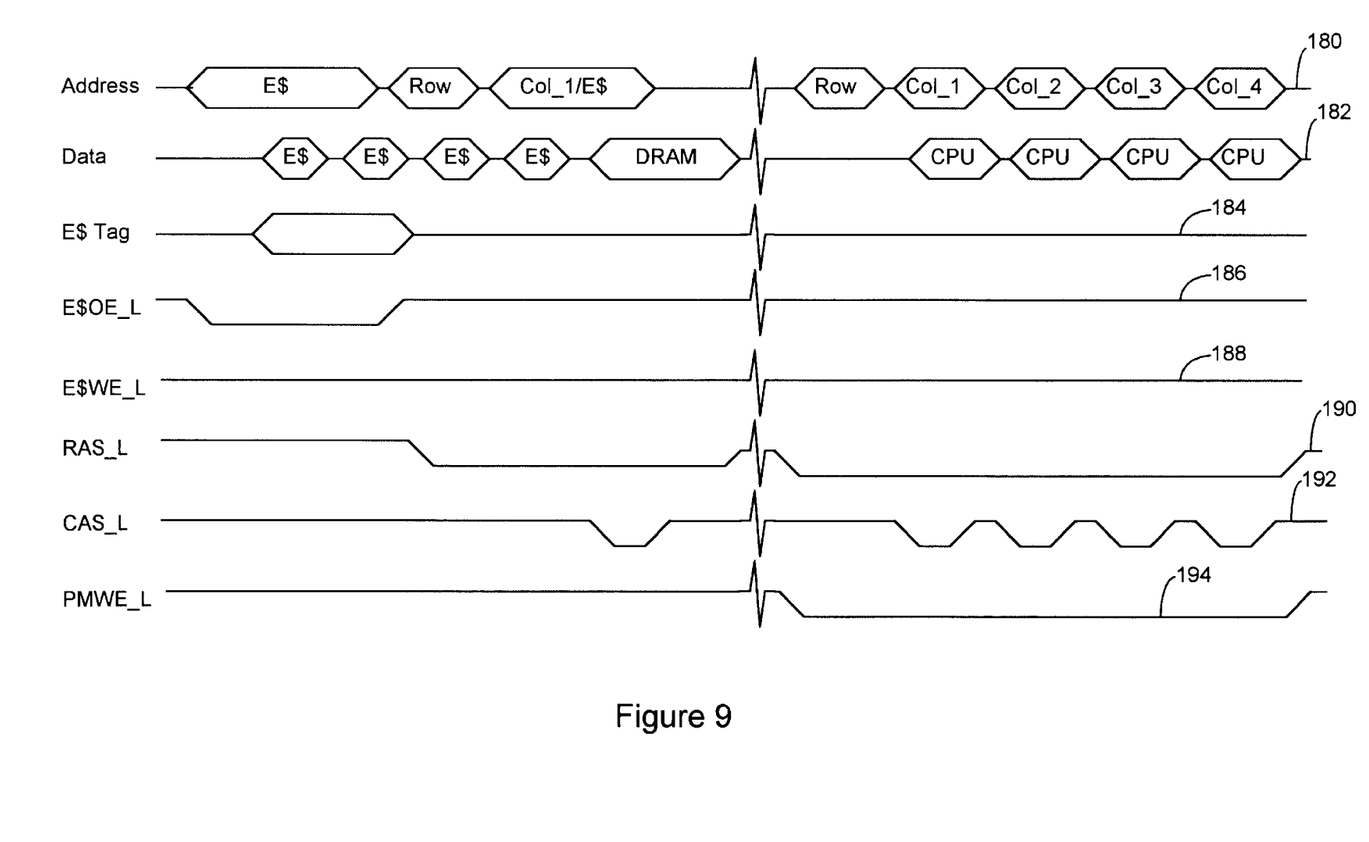
FIG. 9 is a set of timing diagrams showing the apparatus of FIG. 2 processing an external cache write miss with a write-back of modified data to primary memory in a shared column address embodiment of the invention.

FIG. 9 illustrates an external cache write miss with a write-back of modified data to primary memory in a shared column address embodiment of the invention.

Waveform 180 illustrates the launching of an external cache address on the address bus. As in the prior cases, this operation is accompanied by the deassertion of the E$OE_L signal, as shown with waveform 186. Soon thereafter, the external cache 58 returns external cache data, as shown with waveform 182 and an external cache tag, as shown with waveform 184. In this example, the memory controller 54 identifies that the tag does not match. Thus, a row address is launched, followed by a set of column addresses, although waveform 180 only illustrates the launching of a single column address. This results in the return of primary memory (DRAM) data, as shown with waveform 182.

The data returned from primary memory 60 is processed by the CPU 52. The CPU then writes the modified data back to the external cache 58 and the primary memory 60. The technique for writing the modified data back to the external cache 58 may be the sequential technique demonstrated at the end of waveforms 140 and 142 in FIG. 7. Namely, the CPU 52 writes the data to the data bus, while the memory controller 54 writes the external cache address to the address bus.

Returning to FIG. 9, illustrated therein is the technique for writing the same data to primary memory 60. That is, the CPU writes the modified data to the data bus, as shown with waveform 182. Simultaneously, the row and column addresses are applied to the address bus by the memory controller 54, as shown with waveform 180. In addition, the memory controller 54 deasserts the RAS_L signal (as shown with waveform 190), the CAS_L signal (as shown with waveform 192), and the primary memory write enable active low signal (PMWE_L) (as shown with waveform 194).

Figure 10:
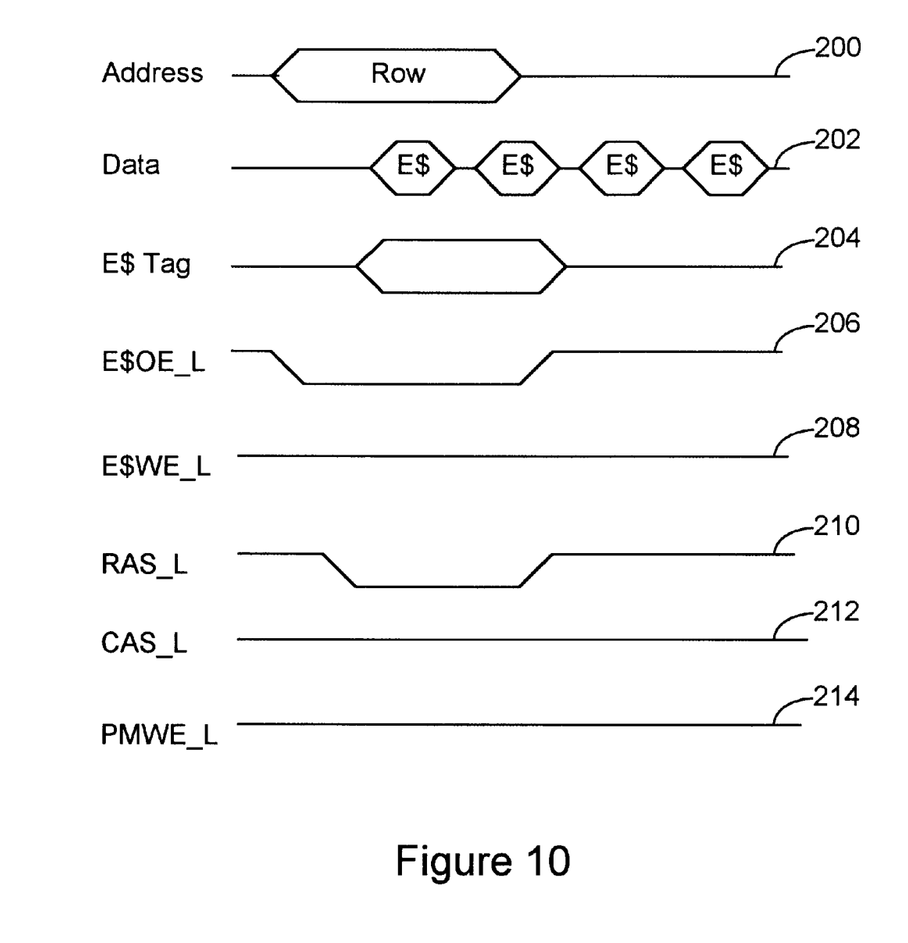
FIG. 10 is a set of timing diagrams showing the apparatus of FIG. 2 processing an external cache read hit in a shared row address embodiment of the invention.
Figure 11:
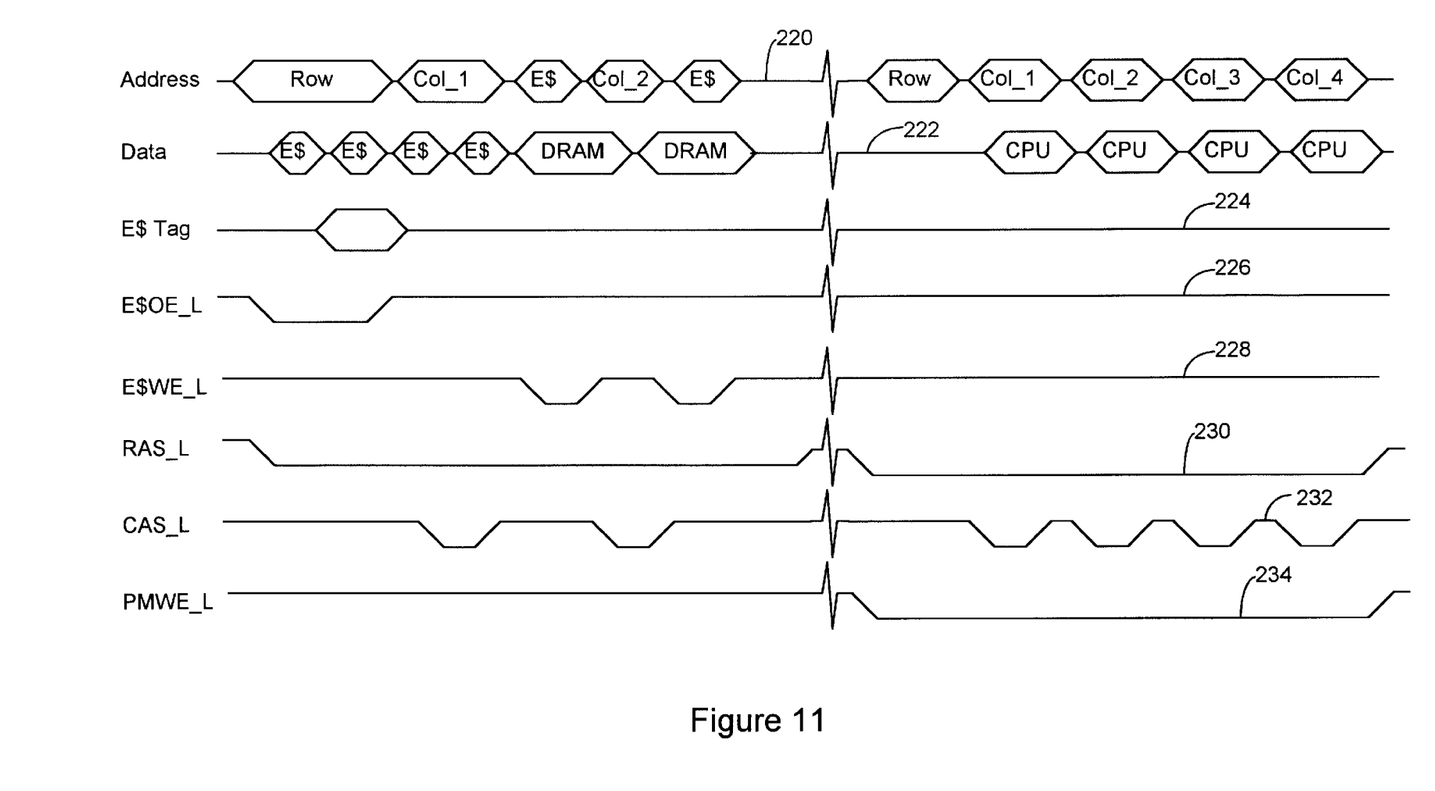
FIG. 11 is a set of timing diagrams showing the apparatus of FIG. 2 processing an external cache read miss with a subsequent external cache fill and primary memory write-back in a shared row address embodiment of the invention.
Figure 12:
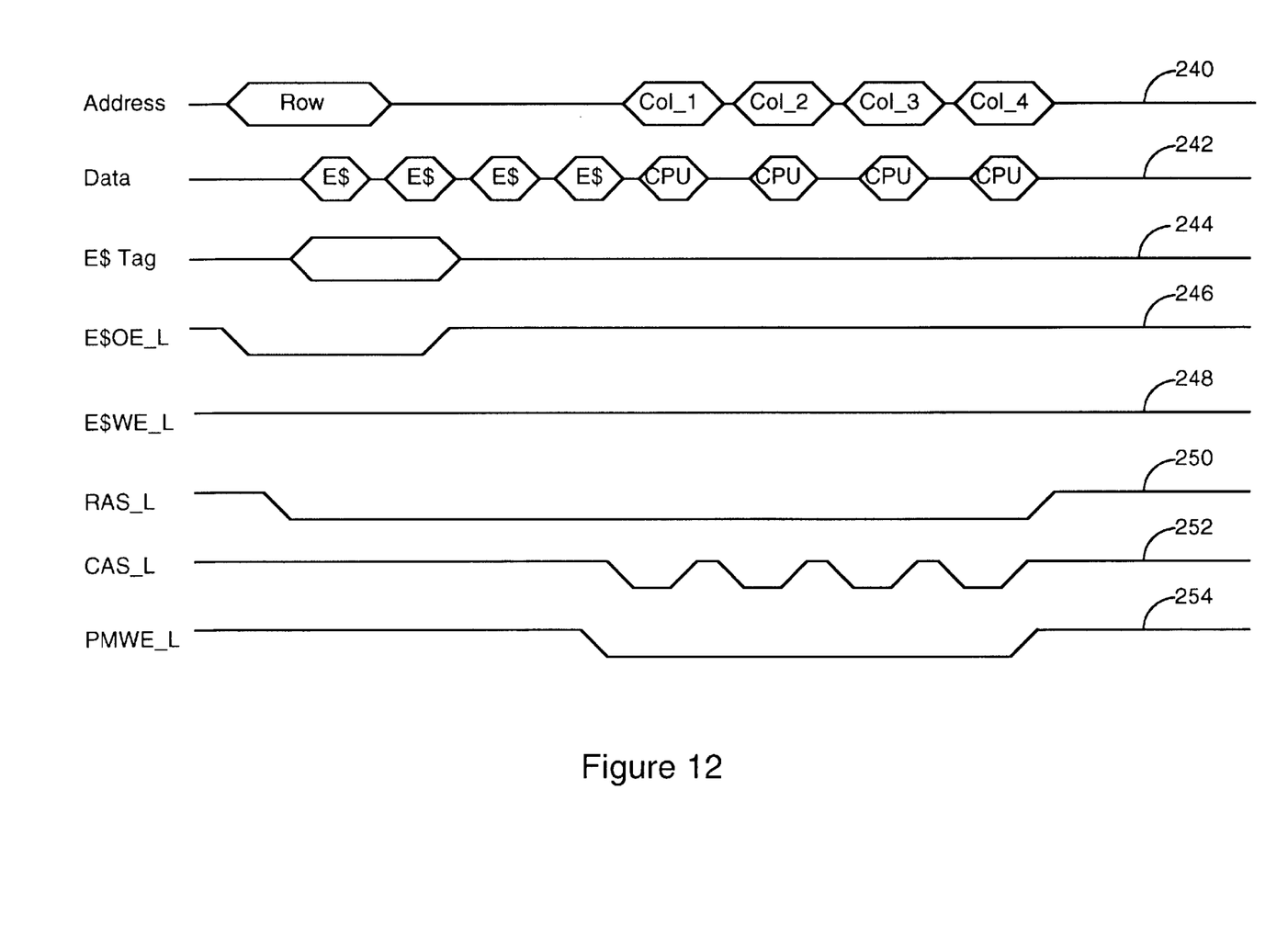
FIG. 12 is a set of timing diagrams showing the apparatus of FIG. 2 processing an external cache write miss with a subsequent primary memory write-back in a shared row address embodiment of the invention.

FIGS. 5–9 have demonstrated various processing techniques that may be used in accordance with a shared column address methodology of the invention. FIGS. 10–12 demonstrate various processing techniques that may be used in accordance with a shared row address methodology of the invention.

Waveform 200 of FIG. 10 illustrates a row address being asserted on the address bus. In the shared row address methodology of the invention a primary memory row address is launched. Selected bits of this row address (for example, the high order bits) are used to address the external cache. Waveform 206 illustrates that the external cache output enable active low signal (E$OE_L) is deasserted when the row address is launched. This allows the selected bits of the row address to be interpreted by the external cache 58. Note that at the same time, the RAS_L signal is deasserted, thereby initiating the primary memory access sequence.

Waveform 202 illustrates the return of external cache data, while waveform 204 illustrates the return of an external cache tag. In this example, the memory controller 54 determines that the external cache tag matches. Therefore, the external cache data is processed. Since the external cache data is to be processed, the RAS_L signal is asserted, as shown with waveform 210, thereby terminating the access to primary memory 60.

The foregoing operations may be coordinated by the shared row processor 80. For example, in response to a cache hit, the external cache hit processor 82 may be used to terminate the deassertion of the RAS_L signal nd thereby terminate the primary memory access.

FIG. 11 illustrates an external cache read miss with a subsequent external cache fill and primary memory write-back in a shared row address embodiment of the invention. The initial processing shown in FIG. 11 is consistent with that shown in FIG. 10. However, in the case of FIG. 11, the external cache tag does not match and therefore a cache miss exists. It should be noted, however, that the external cache data has been received by the CPU 52. Suppose now that the data read by the CPU 52 needs to be overwritten in the external cache 58. In other words, suppose that the data has been evicted and must be written back to primary memory 60. Since the data is in the CPU 52, this data write-back can be performed, as will be discussed below.

As indicated above, in this example, an external cache miss transpires. As a result of the external cache miss, the shared row processor 80, and in particular the external cache miss processor 84, applies a column address to the address bus, as shown with waveform 220. This operation is accompanied by the deassertion of the CAS_L signal, as shown with waveform 232 (recall that the RAS_L signal was previously deasserted).

The combination of the row and column address result in the return of DRAM data from the primary memory 60, as shown with waveform 222. Waveform 220 of FIG. 11 illustrates that an external cache address is launched between column addresses. This allows the DRAM data to be simultaneously loaded into the external cache 58 and the CPU 52. For example, the simultaneous external cache fill logic circuit 86 may be used to launch the external cache address and deassert the external cache write enable (E$WE_L) signal. Note that in FIG. 11 a shared column address is not being used. Instead, standard column addresses are being launched, with standard external cache addresses being interposed between them.

In sum, the first half of FIG. 11 illustrates the reading of external cache data. The external cache tag results in an external cache miss. In response to the external cache tag, data is retrieved from primary memory 60. The retrieved data is simultaneously loaded into the CPU 52 and the external cache 58.

Suppose now that the data that is loaded into the external cache 58 is loaded into the position previously occupied by the data that was just read by the CPU. In this case, the CPU 52 still stores the evicted data and is therefore in a position to write it back to primary memory 60. FIG. 11 illustrates this write-back operation.

Waveform 220 shows a row address being asserted followed by a set of column addresses. This operation is accompanied by the deassertion of the RAS_L signal and the CAS_L signal, as shown with waveforms 230 and 232. Waveform 222 illustrates the data from the CPU being applied to the data bus. The primary memory write enable signal (PMWE_L) is deasserted at this time to allow the data to be written-back to primary memory.

FIG. 12 illustrates an external cache write miss with a subsequent primary memory write-back in a shared row address embodiment of the invention. In FIG. 12, a write-back of a modified value is required. Initially, an attempt is made to write the value back to external cache 58. As shown with waveform 240, a row address is launched on the address bus. As discussed above, selected bits of the row address are used to index into the external cache 58. This results in the return of external cache data, as shown with waveform 242, and an external cache tag, as shown with waveform 244. Suppose this operation results in an external cache miss. In this case, the modified value must be written to primary memory. Thus, a set of column addresses are launched on the address bus, as shown with waveform 240. Synchronously, data from the CPU is written onto the data bus, as shown with waveform 242. The data from the CPU is written into the primary memory 60 as the primary memory write enable signal (PMWE_L) is deasserted, as shown with waveform 254.

The invention disclosed herein is a unified memory bus that is used by both an external cache and a primary memory. The shared row address and shared column address embodiments of the invention have demonstrated different ways of exploiting this architecture. Implementation variations on these disclosed embodiments will be apparent to those skilled in the art.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A computer system, comprising: a central processing unit with an internal memory controller; an external cache;
   a primary memory device; and
   a unified memory bus connecting said central processing unit, said external cache, and said primary memory device;
   wherein said internal memory controller controls said external cache and said primary memory device; and
   wherein said internal memory controller generates a memory address signal and a memory control signal for directly controlling said external cache and said primary memory device, said memory address signal and said memory control signal being applied to said unified memory bus during a memory access operation to simultaneously access said external cache and said primary memory device.

2. The apparatus of claim 1 wherein said internal memory controller generates a shared row address signal that is applied to said unified memory bus to simultaneously access a row in said primary memory device and an address in said external cache, wherein said memory address signal applied to said unified memory bus is composed solely of said shared row address.

3. The apparatus of claim 2 wherein said internal memory controller responds to an external cache hit by halting memory access operations to said primary memory device.

4. The apparatus of claim 2 wherein said internal memory controller responds to an external cache miss by applying a set of column address signals to said unified memory bus.

5. The apparatus of claim 1 wherein said internal memory controller generates a shared column address signal that is applied to said unified memory bus to simultaneously access a column in said primary memory device and an address in said external cache.

6. The apparatus of claim 5 wherein said internal memory controller operates in a shared column address mode to launch an external cache address signal on said unified memory bus followed by a primary memory device address signal in response to an external cache miss.

7. The apparatus of claim 1 wherein said internal memory controller simultaneously loads data from said unified memory bus into said central processing unit and said external cache.

8. The apparatus of claim 1 wherein said internal memory controller sequentially loads data from said unified memory bus into said central processing unit and then into said external cache.

9. The apparatus of claim 1 further comprising a system bus connected to said central processing unit.

10. The apparatus of claim 9 further comprising a plurality of input/output controllers connected to said system bus.

11. The apparatus of claim 1 wherein said memory control signal includes a row address strobe (RAS) signal and a column address strobe (CAS) signal.

12. A method of operating a computer, said method comprising the steps of:
    generating a memory address signal and a memory control signal with an internal memory controller contained within a central processing unit;
    applying said memory address signal and said memory control signal to a unified memory bus connected to an external cache and a primary memory device during a memory read operation to simultaneously access said external cache and said primary memory device, said external cache and said primary memory device being controlled by said memory address signal and said memory control signal; and
    selectively retrieving data from said external cache and said primary memory device in response to said applying step.

13. The method of claim 12 wherein said applying step includes the step of applying a shared row address signal to said unified memory bus to simultaneously access a row in said primary memory device and an address in said external cache, wherein said memory address signal applied to said unified memory bus is composed solely of said shared row address signal.

14. The method of claim 13 wherein said applying step includes the step of halting memory read operations to said primary memory device in response to an external cache hit.

15. The method of claim 13 wherein said applying step includes the step of applying a set of column address signals to said unified memory bus in response to an external cache miss.

16. The method of claim 12 wherein said retrieving step includes the step of generating a shared column address signal that is applied to said unified memory bus to simultaneously access a column in said primary memory device and an address in said external cache.

17. The method of claim 16 wherein said applying step includes the step of launching an external cache address signal on said unified memory bus followed by a primary memory device address signal in response to an external cache miss.

18. The method of claim 12 wherein said retrieving step includes the step of simultaneously loading data into said central processing unit and said external cache.

19. The method of claim 12 wherein said retrieving step includes the step of sequentially loading data into said central processing unit and then into said external cache.

20. The method of claim 12 further comprising the step of passing processed data from said central processing unit to a system bus.

21. The method of claim 20 further comprising the step of retrieving said processed data from said system bus with a selected input/output controller connected to said system bus.

22. The method of claim 12 wherein:
    said generating step includes the step of sequentially generating a row address strobe (RAS) signal and a column address strobe (CAS) signal; and
    said applying step includes the step of sequentially applying said RAS and CAS signals to said unified memory bus.

* * * * *